United States Patent
Kurakake et al.

(10) Patent No.: US 6,703,548 B2
(45) Date of Patent: Mar. 9, 2004

(54) APPARATUS AND METHOD FOR INPUTTING SONG TEXT INFORMATION DISPLAYED ON COMPUTER SCREEN

(75) Inventors: Yasushi Kurakake, Hamamatsu (JP); Yoshiko Fukushima, Hamamatsu (JP)

(73) Assignee: Yamaha Corporation, Hamamatsu (JP)

( * ) Notice: Subject to any disclaimer, the term of this patent is extended or adjusted under 35 U.S.C. 154(b) by 228 days.

(21) Appl. No.: 09/901,989

(22) Filed: Jul. 10, 2001

(65) Prior Publication Data

US 2002/0005107 A1 Jan. 17, 2002

(30) Foreign Application Priority Data

Jul. 13, 2000 (JP) .................................... 2000-212899

(51) Int. Cl.$^7$ .............................................. G09B 15/08
(52) U.S. Cl. ........................................................ 84/478
(58) Field of Search .................... 84/470 R, 471 R, 84/477 R, 478, 483.1, 483.2, DIG. 6

(56) References Cited

U.S. PATENT DOCUMENTS

| | | | | | |
|---|---|---|---|---|---|
| 4,945,804 A | * | 8/1990 | Farrand | ..................... | 84/478 X |
| 5,549,029 A | * | 8/1996 | Lepinski | ..................... | 84/483.2 |
| 6,051,769 A | * | 4/2000 | Brown | ..................... | 84/477 R |
| 6,053,740 A | * | 4/2000 | Nakata et al. | ..................... | 434/307 A |
| 6,066,791 A | * | 5/2000 | Renard et al. | ..................... | 84/477 R |
| 6,072,114 A | * | 6/2000 | Kunimasa | ..................... | 84/477 R |
| 6,084,168 A | * | 7/2000 | Sitrick | ..................... | 84/477 R |
| 6,156,964 A | * | 12/2000 | Sahai et al. | ..................... | 84/470 R |
| 6,459,029 B2 | * | 10/2002 | Uehara | ..................... | 84/477 R |

FOREIGN PATENT DOCUMENTS

JP          10-124075          5/1998

* cited by examiner

*Primary Examiner*—Jeffrey Donels
(74) *Attorney, Agent, or Firm*—Morrison & Foerster LLP

(57) ABSTRACT

A song text information input system allows a user to easily input song text control information for controlling the display manner of song texts on the screen without having preknowledge of specific rules for control and use of character codes. The system displays a song text input window that contains a song text expansion area and switch buttons corresponding to a change-line switch and a change-page switch respectively. Using a keyboard, the user is able to sequentially input characters of a song text, which are displayed in the song text expansion area on the screen. As for entry of the song text control information, the user operates specific keys of the keyboard or clicks the switch buttons with a mouse to input special marks such as a change-line mark '/' and a change-page mark '<', which correspond to specific control character codes.

12 Claims, 5 Drawing Sheets

ドはドーナツのド
レはレモンのレ

ミはみんなのミ

APPARATUS AND METHOD FOR INPUTTING SONG TEXT INFORMATION DISPLAYED ON COMPUTER SCREEN

BACKGROUND OF THE INVENTION

1. Field of the Invention

This invention relates to apparatuses and methods for inputting song text information representing character strings for words of songs, which are displayed on computer screens in accordance with progression of musical performance. This invention also relates to machine-readable media storing programs implementing the song text input methods.

2. Description of the Related Art

Conventionally, various types of systems (e.g., hardware systems and software systems) are proposed for inputting text data representing character strings for words of songs by means of keyboards. These systems are designed to input song text information in the prescribed format of character codes, so that the words of a song are sequentially displayed on a screen of a display in accordance with progression of a musical performance, which is played based on performance information. The song text information includes so-called 'return marks' or 'change-line marks', i.e., marks representing changes of lines by which character strings displayed on the screen are vertically changed in position. Generally, the change-line marks correspond to the specific character code representing a slash symbol '/' whose ASCII code is '2F'. Therefore, users operate the keyboards to input the change-line marks similarly to the general characters (such as the alphabetic characters, numerals, and roman characters).

As described above, it is necessary for users to have preknowledge that the change-line mark corresponds to the specific character code of the slash symbol '/' in advance. If users do not have such preknowledge in advance, they cannot input the change-line marks by keyboards on screens of displays.

Therefore, there is a demand to provide a song text information input system with user-aid functions for allowing users to easily input song text information on the screen of the display without having preknowledge of specific rules for control and use of character codes.

SUMMARY OF THE INVENTION

It is an object of the invention to provide a song text information input system that allows a user to easily input song text information on a screen of a display without having preknowledge of specific rules for control and use of character codes such as change-line marks and change-page marks.

This invention provides a song text information input system that allows a user to easily input song text control information for controlling the display manner of song texts on a screen of a display without having preknowledge of specific rules for control and use of character codes. The system displays a song text input window that contains a song text expansion area and switch buttons corresponding to a change-line switch and a change-page switch respectively. Using a keyboard, the user is able to sequentially input characters of a song text, which are displayed in the song text expansion area on the screen. Herein, the input characters correspond to normal character codes for designating Japanese characters, numerals, and roman letters, for example. As for entry of the song text control information, the user operates specific keys of the keyboard or clicks the switch buttons with a mouse to input special marks such as a change-line mark '/' and a change-page mark '<', which correspond to specific control character codes such as ASCII codes of '2F' and '3C'. These marks can be arbitrarily inserted among the characters of the song text displayed in the song text expansion area.

Because of the insertion of a change-line mark, consecutive character strings are automatically split and displayed at vertically different lines on the screen. By insertion of a change-page mark, consecutive character strings are automatically split and displayed on different pages of the song text on the screen.

Because of the provision of the switch buttons and the prescribed assignment of control character codes, it is possible to provide the 'user-friendly' song text information input system, which is easy to handle and is easily actualized by a personal computer and the like.

Incidentally, it is possible to provide machine-readable media such as floppy disks, CD-ROMs, and other portable storage media that record programs regarding methods for inputting song text information as described above.

BRIEF DESCRIPTION OF THE DRAWINGS

These and other objects, aspects and embodiments of the present invention will be described in more detail with reference to the following drawing figures, of which.

DESCRIPTION OF THE PREFERRED EMBODIMENT

This invention will be described in further detail by way of examples with reference to the accompanying drawings.

1. Hardware Configuration

Figure 1:
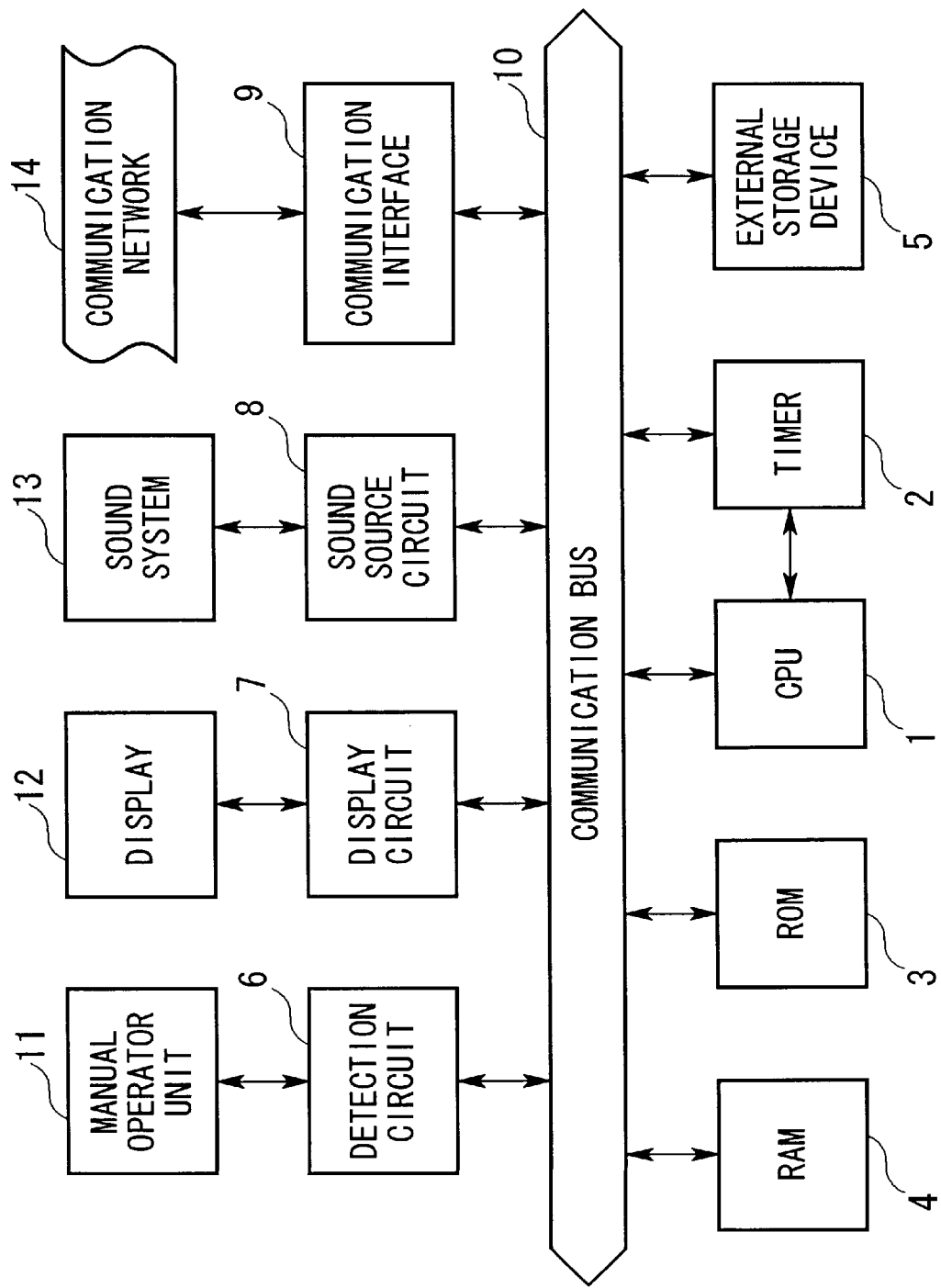
FIG. 1 is a block diagram showing a hardware configuration of a song text information input system in accordance with a preferred embodiment of the invention.

FIG. 1 shows a hardware configuration of a song text information input system in accordance with an embodiment of the invention. This hardware configuration corresponds to a personal computer that performs various kinds of processes such as a song text input process and a musical tune reproduction process. The song text information input system (hereinafter, simply referred to as the 'system') contains a central processing unit (CPU) 1, a timer 2, a read-only memory (ROM) 3, a random-access memory (RAM) 4, an external storage device 5, a detection circuit (or detection circuits) 6, a display circuit 7, a sound source circuit 8, and a communication interface (I/F) 9. These elements 1–9 are mutually interconnected together by way of a communication bus 10.

The CPU 1 performs overall controls on the system in accordance with the prescribed software program. That is, the CPU 1 performs various types of controls in synchronization with clock pulses generated by the timer 2. Particularly, the CPU 1 pivotally executes the song text input process and musical tune reproduction process, details of which will be described later. The ROM 3 stores control programs for controlling the system. The control programs contain basic information processing as well as various kinds of programs, tables, and data that are related to the song text input process and musical tune reproduction process of this invention, for example. The RAM 4 stores data and parameters that are necessary for executing the aforementioned processes. In addition, the RAM 4 is also used as a work area for temporarily storing registers and flags as well as processed data, for example.

As the external storage device 5, it is possible to employ existing disk drives such as the hard-disk drive (HDD), CD-ROM drive, floppy disk drive (FDD), magneto-optic (MO) disk drive, and digital versatile disk (DVD) drive as well as portable storage media such as memory cards, for example. Therefore, the external storage device 5 is capable of storing the control programs and data for use in the present system. Programs and data that are necessary for execution of the song text input process are not necessarily stored in the ROM 3 only. In other words, these programs and data can be stored (or be pre-installed) in the external storage device 5, from which they are transferred to the RAM 4. In addition, processing results can be stored in the external storage device 5 as necessary.

The detection circuit 6 is connected to a manual operator unit 11, which the user operates to input various pieces of information. For example, the manual operator unit 11 can be actualized by a keyboard containing keys (i.e., 'operators') and a pointing device such as a mouse. The keyboard arranges various types of keys allowing the user to input characters based on normal character codes. In addition, it is possible to make the prescribed setup for the keyboard in such a manner that functions of a change line key and a change page key are assigned to the prescribed keys to allow the user to input a change-line mark and a change-page mark as control character codes. Further, the keyboard also contains an Enter key for fixing entry of characters and other symbols. The display circuit 7 is connected to a display 12 to provide indicators. The display 12 displays switch buttons and a cursor that can be operated by the pointing device. The switch buttons contain a change-line switch button for inputting a change-line mark and a change-page switch button for inputting a change-page mark. In addition, they also contain an enter switch button for fixing entry of characters, for example.

The sound source circuit 8 is connected to a sound system that contains an effect circuit, a speaker, and the like. The effect circuit is configured by a digital signal processor (DSP). Therefore, the sound source circuit 8 reads performance information from musical tune data which are stored in the RAM 4, so that it controls the sound system 13 to reproduce (or play back) musical tones based on the performance information. In addition, the present system installs the so-called 'karaoke' function that allows the user to enjoy singing a song with pre-recorded musical sounds of orchestration. That is, the system reads song text information from the musical tune data to display words of the song, which the user selects, on the screen of the display 12 along with reproduction of the musical sounds. The communication interface 9 is connected to a communication network 14, which is configured by the local area network (LAN), Internet, and telephone lines, for example. By way of the communication interface 9 connected to the communication network 14, the system downloads control programs and data from the server computer (not shown) to store them in the external storage device 5.

The present embodiment describes the hardware configuration as the personal computer. Of course, other devices or instruments can be used to actualize the aforementioned hardware configuration of the present embodiment. For example, it is possible to use an electronic musical instrument or a portable terminal device such as a cellular phone instead of the personal computer. In addition, the present embodiment describes the manual operator unit 11 in such a way that the change-line key and change-page key of the keyboard are provided to input the change-line mark and change-page mark respectively, while the change-line switch button and change-page switch button are displayed on the screen of the display 12 and are operated by clicks of the mouse. It is possible to reconstruct the manual operator unit 11 to have different manual operators whose functions are equivalent to the functions of the aforementioned keys and buttons.

2. Configuration of Musical Tune Data

Figure 2:
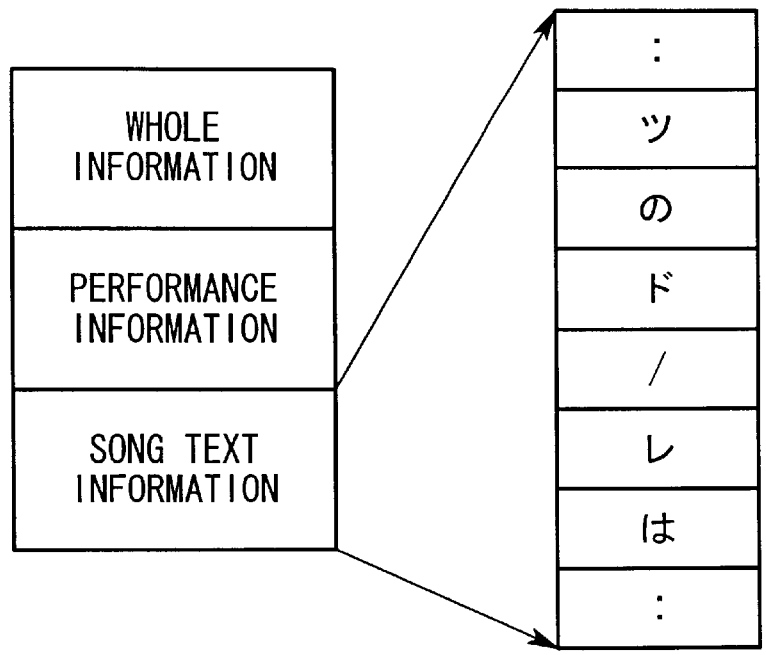
FIG. 2 shows an example of a configuration of musical tune data, which is basically configured by whole information, performance information and song text information.

FIG. 2 shows an example of a configuration of musical tune data for use in the present embodiment. The musical tune data are configured by whole information, performance information, and song text information, which are stored in a musical tune data file of the external storage device 5 with respect to a musical tune. The whole information is formatted information for the musical tune, which is not included in the performance information and song text information. For example, the whole information includes the title and composer of the musical tune. The performance information includes musical performance of the musical tune to be reproduced. For example, the performance information is configured by two types of information that are alternately arranged in the prescribed reproduction order, namely performance events and timing information. Herein, the timing information represents a processing timing for each performance event. In short, the performance information is described in the prescribed format of 'SMF' (i.e., 'Standard MIDI File', where 'MIDI' is an abbreviation for 'Musical Instrument Digital Interface'), which is conventionally known.

The song text information is used to reproduce a song text consisting of characters included in words or characters of a song, and it is configured by two types of information, namely song text events and timing information. Herein, the song text events indicate character string data consisting of characters of the song to be displayed on the screen, and the timing information contain display start timing data that designate the timings for starting display of the characters of the song text by units of pages or by units of words respectively.

Specifically, the right-hand block of FIG. 2 shows a part of the song that is known as the 'do-re-mi' song, wherein each division of the block shows each of the Japanese syllables (including Japanese syllabary 'kana' and 'katakana' characters) of the selected part of the 'do-re-mi' song. Herein, a slash symbol '/' is inserted between the two Japanese katakana characters for 'do' and 're'. Hence, the character string data correspond to the aforementioned Japanese syllables and the like in FIG. 2. Incidentally, FIG. 2 excludes an indication of the timing information included in the song text information.

The character string data for the song text events are configured by text data that are stored in the prescribed format of character codes, and other text information such as the change-line mark '/' (whose ASCII code is '2F') and the change-page mark '<' (whose ASCII code is '3C'). The change-line mark '/' is inserted between a last character of one character string and a first character of the next character string, so that these character strings are simultaneously displayed on the screen at vertically different lines. In addition, the change-page mark '<' is inserted between a last character of one character string and a first character of the next character string, so that these character strings are consecutively displayed on the screen on the different pages. That is, the whole portion of the song text is adequately divided into plural pages by using the change-page marks, so that each of the divided portions of the song text is displayed on each of the plural pages on the screen in connection with a song text event of one page.

The timing information included in the song text information designate timings by which characters of the song text are to be reproduced in synchronization with progression of the musical performance (or notes of the musical tune). Actually, the display 12 simultaneously shows a set of characters as an image of the song text on the screen, and it consecutively switches over images of the song text between plural pages on the screen. FIG. 1 excludes an indication of a timing input device that is used to input switch timing information, by which images of the song text are switched over between the plural pages on the screen in accordance with progression of the musical performance, which is played based on the performance information. In addition, the characters of the song text are respectively displayed on the screen in relation with their corresponding notes of the musical tune by specific colors. In this case, it is possible to set color change control information by which the characters of the song text are sequentially changed over in color as their corresponding notes are played sequentially in the musical performance of the musical tune. Incidentally, changing the color is not necessarily carried out with respect to a time resolution corresponding to each character on the screen. That is, the present system can allow the user to set the color change control information by a smaller time resolution that is smaller than the time resolution of the character.

3. Song Text Input Process

Figure 3:
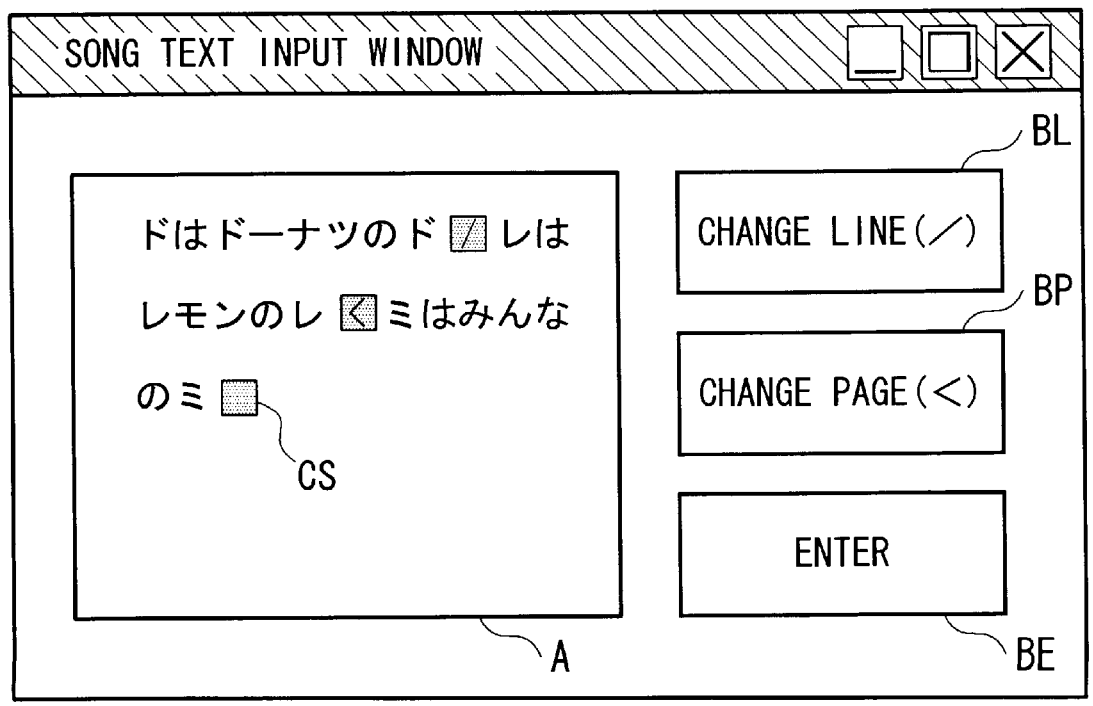
FIG. 3 shows an example of a song text input window that allows the user to input song text information by units of characters and symbols on the screen.
Figure 4:
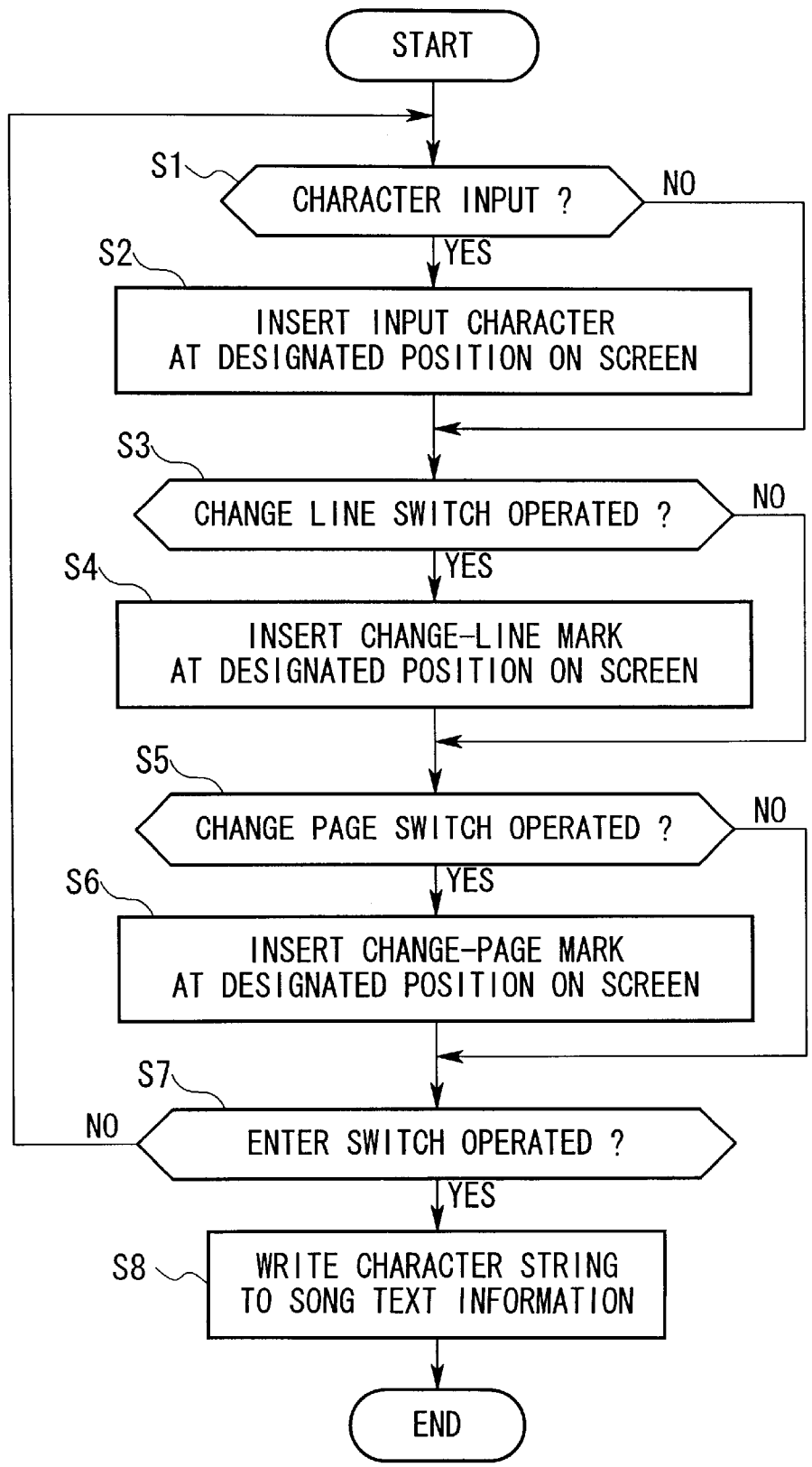
FIG. 4 is a flowchart showing a song text input process executed by the song text information input system.

FIG. 3 shows an example of a song text input window that allows the user to input song text information on the screen of the display 12. FIG. 4 shows a song text input process that is executed by the song text information input system shown in FIG. 1. Processing of the song text information input system is started by a main routine (not shown), in which the user is able to designate the song text input process to start. Thus, the display 12 automatically displays the image of FIG. 3 on the screen.

In the song text input window shown in FIG. 3, the display 12 shows a song text expansion area A, a change-line switch button (simply referred to as a change-line switch) BL for inputting a change-line mark, a change-page switch button (simply referred to as a change-page switch) BP for inputting a change-page mark, and an enter switch button BE (simply referred to as an enter switch). The song text expansion area A is used to expand character strings of the song text that are input by the user. The enter switch BE is used to fix the input character strings in the song text expansion area A on the screen, so that the input character strings are written to the musical tune data file of the external storage device 5. Using the window of FIG. 3 displayed on the screen, the user is able to sequentially input the song text character by character.

In the song text information input system of the present embodiment, the user operates the keyboard of the manual operator unit 11 while watching the displayed content of the song text input window of FIG. 3 on the screen. Thus, the user inputs song text display information with respect to characters to be sequentially displayed in accordance with progression of the musical performance based on the performance information. The song text display information defines normal character codes, which correspond to the Japanese kana and katakana characters to suit the song text. In addition, the user is able to input song text control information that define display manners of the song text on the screen. The present embodiment provides specific switches, namely the change-line switch BL and change-page switch BP for designating the change-line mark '/' and change-page mark '<', which are displayed on the screen of the display 12 as shown in FIG. 3. Thus, the user is able to input the song text control information (i.e., control character codes for designating changes of lines and/or pages) by operating the aforementioned switches. Specifically, when the user clicks the change-line switch BL with the mouse of the manual operator unit 11, a change-line mark '/' is automatically input to the system. When the user clicks the change-page switch BP with the mouse, a change-page mark '<' is automatically input to the system.

When the song text input process of FIG. 4 is started, the flow firstly proceeds to step S1 in which detection is made as to whether or not the user operates the manual operator unit 11 to input a character in a normal character input mode. In the normal character input mode, the user operates the keyboard to input 'normal' characters such as the Japanese characters representing the song text. If the system detects an input of a normal character by the user, the flow proceeds to step S2 in which the input character is automatically inserted at a designated position in the song text expansion area A shown in FIG. 3. Herein, the user is able to arbitrarily designate a position for insertion of the input character by a cursor CS, which can be freely moved within the song text expansion area A by operating cursor movement (arrow) keys of the keyboard or by operating the mouse. If the system does not detect an input of the character by the user, the flow directly proceeds to step S3.

In step S3, detection is made as to whether the user inputs a change-line mark '/' by operating the manual operator unit 11 or not. In the present embodiment, the user is able to input a change-line mark by clicking the change-line switch BL with the mouse or by pressing a Return key of the keyboard (not shown). When the system detects an input of a change-line mark by the user, the flow proceeds to step S4 in which the change-line mark is automatically inserted at a designated position corresponding to the cursor CS within the song text expansion area A on the screen. In the case of FIG. 3, the change-line mark '/' is enhanced by a meshed square pattern on the screen in order to attract the user's attention to the displayed position of the change-line mark on the screen. Actually, however, such an enhancement is not necessarily effected on the change-line mark and the like on the screen. After completion of the step S4, or when the system does not detect an input of a change-line mark in step S3, the flow proceeds to step S5.

In step S5, detection is made as to whether the user inputs a change-page mark '<' by operating the manual operator unit 11 or not. In the present embodiment, the user is able to input the change-page mark by clicking the change-page switch BP with the mouse or by pressing a Return key of the keyboard. When the system detects an input of a change-page mark by the user, the flow proceeds to step S6 in which the change-page mark '<' is automatically inserted at a designated position corresponding to the cursor CS within the song text expansion area A on the screen. In the case of FIG. 3, the change-page mark '<' is enhanced by a meshed square pattern on the screen in order to attract the user's attention to the displayed position of the change-page mark. Actually, however, such an enhancement is not necessarily effected on the change-page mark on the screen. After completion of the step S6, or when the system does not detect an input of a change-page mark in step S5, the flow proceeds to step S7.

In step S7, a decision is made as to whether the user operates the manual operator unit 11 to fix the input or not. In the present embodiment, the user is able to fix the input by clicking the enter switch BE with the mouse or by pressing an Enter key of the keyboard (which may correspond to the foregoing Return key). If the user does not operate the enter switch BE (or Enter key), the flow returns back to the step S1, so that the system repeats the foregoing steps S1 to S6 until a decision result of step S7 turns to "YES". Through the steps S1–S7, character strings containing characters of the song text and other symbols (such as the change-line mark and change-page mark) are to be sequentially input to the system, so that they are displayed in the song text expansion area A on the screen of the display 12. When the system detects in step S7 that the user operates the enter switch BE (or the Enter key), the flow proceeds to step S8 in which the input character strings displayed in the song text expansion area A are written to the song text information. Then, the system ends the song text input process of FIG. 7. The song text information is recorded as the aforementioned song text events within the musical tune data shown in FIG. 2.

In the song text input process described above, the user operates the keyboard of the manual operator unit 11 to input the song text display information by the normal character input method using the normal character codes, so that the corresponding normal characters are displayed on the screen of the display 12 in accordance with the song text display information. As for the entry of the song text control information, the user is able to use the change-line key and change-page key, functions of which are assigned to the prescribed keys of the keyboard, without using the change-line switch BL and change-page switch BP displayed on the screen (see FIG. 3). That is, the user operates the aforementioned keys of the keyboard to input the control character codes such as the change-line mark '/' and change-page mark '<', so that manners of displaying the characters are controlled based on the song text control information. Similarly, the user is able to use the enter key of the keyboard without using the enter switch BE displayed on the screen.

4. Musical Tune Reproduction Process

Figure 5:
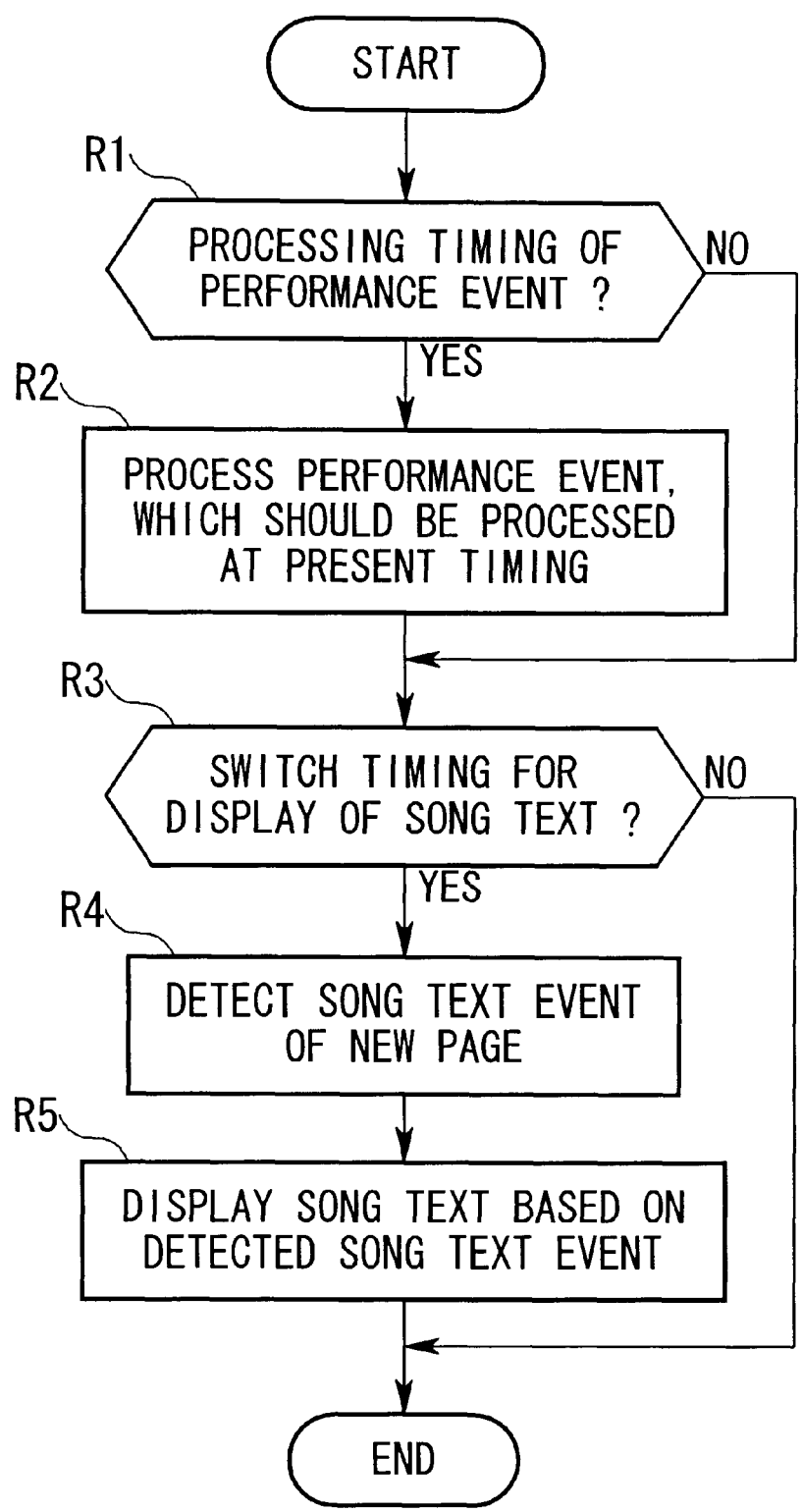
FIG. 5 is a flowchart showing a musical tune reproduction process.

FIG. 5 shows an example of a musical tune reproduction process in accordance with the embodiment of the invention. The musical tune reproduction process is started when the user designates a start of reproduction of a musical tune in the main routine (not shown). In the main routine, the musical tune reproduction process acts as an interrupt process that is executed by every prescribed time. Then, the system ends the musical tune reproduction process when the user designates an end of reproduction of the musical tune or at completion of the reproduction of the musical tune data.

When the musical tune reproduction process is started, the flow firstly proceeds to step R1 in which a decision is made as to whether the present timing corresponds to a processing timing of a performance event or not. If "YES", the flow proceeds to step R2 in which the system processes the performance event, which should be processed at the present timing, and then the flow proceeds to step R3. If "NO", the flow directly proceeds to step R3. As described before, both of the performance event and song text event contain the timing information by which displaying the song text is performed in synchronization with the reproduction of the musical performance. Therefore, these events are sequentially processed in accordance with the timing information.

In step R3, a decision is made as to whether the present timing corresponds to a switch timing for switching over displayed images of the song text or not, in other words, a decision is made as to whether or not the song text is changed over from one page to another on the screen. If "NO", the system immediately ends the musical tune reproduction process. If "YES", the flow proceeds to step R4 in which the system extracts a song text event of a new page from the song text information. In step R5, the corresponding characters are automatically displayed on the screen of the display 12 on the basis of the extracted song text event of the new page. Then, the system ends the musical tune reproduction process.

Incidentally, it is possible to control the display 12 in such a manner that characters of one page of the song text are changed in color in accordance with the color change control information. Thus, the characters of the song text are sequentially changed in color in synchronization with progression of the musical performance. In short, the user is able to enjoy the 'karaoke' performance using the display 12 of the present system.

Figures 6A, 6B:
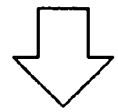
FIG. 6A shows two character strings that belong to the same page of the song text and are displayed at vertically different lines on the screen.
FIG. 6B shows another character string that belongs to the next page of the song text being updated on the screen.

FIGS. 6A and 6B show a transition of characters of the song text from one page to another on the screen of the display 12. The characters shown in FIGS. 6A and 6B correspond to the aforementioned character strings displayed in the song text expansion area A shown in FIG. 3. Herein, the display 12 automatically changes over the displayed contents of the song text by every page. Specifically, the user inputs the song text information as shown in FIG. 3 in such a manner that three character strings are input together with a change-line mark '/' and a change-page mark '<', wherein a first character string is started by a Japanese katakana character 'ド' (i.e., 'do' in English), a second character string is started by a Japanese katakana character 'レ' (i.e., 're' in English), and a third character string is started by a Japanese katakana character 'ミ' (i.e., 'mi' in English). Herein, the first and second character strings belong to the same page, and the third character string solely belongs to the next page. FIG. 6A shows the page of the song text that contains the first and second character strings, which are displayed on the screen at the vertically different lines respectively because of insertion of the change-line mark '/' between the first and second character strings. Firstly, the display 12 displays the first and second character strings of the song text on the screen as shown in FIG. 6A. Then, when it comes to the switch timing for switching over displayed contents of the song text from one page to another due to progression of the musical performance, a decision result of step R3 turns to "YES" so that the system detects the control character code representing the change-line mark '<', which is inserted between the second and third character strings, in conformity with the switch timing in step R4. In step R5, the system extracts the song text information of the next page, that is, the third character string, which is displayed on the screen as shown in FIG. 6B. Thus, images of the song text displayed on the screen are sequentially updated from one page to another as shown in FIGS. 6A and 6B.

The present embodiment is basically designed to use the control character codes as representation of the change-line mark '/' and change-page mark '<', which designate the special functions for changing lines and pages of the song text on the screen. This invention is not necessarily limited by the aforementioned embodiment. That is, it is possible to use other general-purpose character codes such as the ASCII codes and JIS codes (where 'JIS' is an abbreviation for 'Japanese Industrial Standard'). Herein, the special functions regarding the display of the song text can be assigned to some of the usable codes selected from among the aforementioned codes. As the special functions, it is possible to list changes of lines, changes of pages, and insertion of blanks (that is normally assigned to the space bar of the keyboard), for example. That is, the special functions for controlling the display of the song text on the screen can be assigned to any types of symbols or characters other than the aforementioned symbols '/' and '<'. Hence, the user is able to optimally control the display of the song text by using the desired control character codes, which are arbitrarily selected from among the specific codes.

In addition, the musical tune data is not necessarily configured by three pieces of information, which are independently stored in the external storage device 5. That is, it is possible to combine together the performance information and song text information, a mixture of which is stored in the same area of the external storage device 5. Specifically, the performance events and song text events are alternately arranged and sequentially stored in the storage in accordance with the time information.

As described heretofore, this invention has a variety of technical features and effects, which are described below.

(1) A song text information input system is provided to input song text information representing words or characters of a song text, which are displayed and updated on the screen in accordance with progression of musical performance based on performance information. As for entry of song text control information indicating a change-line mark and a change-page mark for controlling display manners of the song text on the screen, the song text information input system provides special switches, namely a change-line switch and a change-page switch that are automatically displayed together with a song text expansion area showing input characters and symbols, on the screen. Clicking these switches with the mouse, the user is able to input the change-line mark and change-page mark at desired positions among character strings being sequentially input and displayed in the song text expansion area on the screen. Because of the provision of the special switches automatically displayed on the screen, the user is able to easily input the song text control information without having preknowledge of special symbols or characters designating the change-line mark and change-page mark.

(2) Specifically, the song text control information designate a change-line mark '/' indicating a change of lines and a change-page mark '<' indicating a change of pages. On the screen, the system always displays titles of the special switches such as 'change line' and 'change page' together with their symbols such as '/' and '<'. This improves the song text information input system to have the user-friendly feature.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within metes and bounds of the claims, or equivalence of such metes and bounds are therefore intended to be embraced by the claims.

What is claimed is:

1. a song text information input apparatus comprising:
    an input device for inputting song text display information indicating characters contained in a song text to be displayed on a screen of a display;
    at least one switch for inputting song text control information for controlling a display manner of the song on the screen, said song text control information including one of a change-line mark and a change-page mark, wherein said one of a change-line mark and a change-page mark is displayed on the screen of the display; and
    a memory for recording the inputted song text display information and the inputted song text control information as song text information.

2. A song text information input apparatus according to claim 1, wherein the input device corresponds to a keyboard containing keys for inputting the characters of the song text, and the switch corresponds to a specific key of the keyboard that is pressed to automatically input the song text control information.

3. A song text information input apparatus according to claim 1, wherein the switch corresponds to a switch button that is displayed on the screen and is designated by a pointing device to automatically input the song text control information.

4. A song text information input apparatus according to claim 1, wherein the song text control information is inserted at an arbitrary position among the characters of the song text.

5. A song text information input apparatus comprising:
    a display;
    a keyboard containing keys for inputting characters of a song text to be displayed on a screen of the display; and
    a plurality of switches for inputting song text control information designating insertion of a change-line mark by which consecutive character strings of the song text are split and displayed on different lines on the screen and a change-page mark by which consecutive character strings of the song text are split and displayed on different pages on the screen.

6. A song text information input apparatus according to claim 5, wherein the plurality of switches are assigned to specific keys of the keyboard, which are pressed to automatically input the song text control information.

7. A song text information input apparatus according to claim 5, wherein the plurality of switches are displayed on the screen and are operated by a pointing device to automatically input the song text control information.

8. A song text information input apparatus according to claim 7, wherein the input characters of the song text are displayed within a song text input window that is displayed together with the plurality of switches on the screen.

9. A song text information input method comprising the steps of:
    automatically displaying at least one switch for inputting song text control information on a screen of a display, said song text control information including one of a change-line mark and a change-page mark;
    allowing a user to input song text display information designating characters of a song text on the screen;
    upon detection of a user's operation of the switch, automatically inserting the song text control information among the characters of the song text on the screen; and recording the inputted song text control information and the inputted song text display information as song text information.

10. A song text information input method comprising the steps of:

displaying a plurality of switches for inputting song text control information on a screen of a display;

allowing a user to input characters of a song text by means of a keyboard;

displaying the input characters of the song text within a song text expansion area together with the plurality of switches on the screen;

discriminating a type of the song text control information, which is designated by a user's operation of a specific key of the keyboard or a user's operation for the switch, between insertion of a change-line mark by which consecutive character strings of the song text are split and displayed at different lines on the screen and insertion of a change-page mark by which consecutive character strings of the song text are split and displayed on different pages on the screen; and automatically inserting the change-line mark or the change-page mark between the consecutive character strings of the song text within the song text expansion area on the screen.

11. A machine-readable media storing programs that cause a computer having a display to perform a song txt information input method comprising the steps of:

automatically displaying at least one switch for inputting song text control information on a screen of the display, said song text control information including one of a change-line mark and a change-page mark;

allowing a user to input song text display information designating characters of a song text on the screen;

upon detection of a user's operation of the switch, automatically inserting the song text control information among the characters of the song text on the screen; and recording the inputted song text control information and the inputted song text display information as song text information.

12. A machine-readable media storing programs that cause a computer having a display to perform a song text information input method comprising the steps of:

displaying a plurality of switches for inputting song text control information on a screen of the display;

allowing a user to input characters of a song text by means of a keyboard;

displaying the input characters of the song text within a song text expansion area together with the plurality of switches on the screen;

discriminating a type of the song text control information, which is designated by a user's operation of a specific key of the keyboard or a user's operation for the switch, between insertion of a change-line mark by which consecutive character strings of the song text are split and displayed at different lines on the screen and insertion of a change-page mark by which consecutive character strings of the song text are split and displayed on different pages on the screen; and automatically inserting the change-line mark or the change-page mark between the consecutive character strings of the song text within the song text expansion area on the screen.

\* \* \* \* \*